(12) United States Patent
Braganca et al.

(10) Patent No.: US 9,352,308 B2
(45) Date of Patent: May 31, 2016

(54) SOLID CATALYST COMPONENT FOR POLYMERIZATION AND COPOLYMERIZATION OF ETHYLENE AND PROCESS FOR OBTAINING THE SAME

(75) Inventors: Antonio Luiz Duarte Braganca, Porrto Alegre (BR); Marcia Silva Lacerda Miranda, Porto Alegre (BR); Leandro dos Santos Silveira, Canoas (BR); Richard Faraco Amorim, Porto Alegre (BR)

(73) Assignee: BRASKEM S.A., Camacari (BR)

( * ) Notice: Subject to any disclaimer, the term of this patent is extended or adjusted under 35 U.S.C. 154(b) by 0 days.

(21) Appl. No.: 13/440,384

(22) Filed: Apr. 5, 2012

(65) Prior Publication Data

US 2012/0190805 A1    Jul. 26, 2012

Related U.S. Application Data

(63) Continuation-in-part of application No. 10/518,443, filed as application No. PCT/BR02/00086 on Jun. 19, 2002, now abandoned.

(51) Int. Cl.

| | |
|---|---|
| *C08F 4/76* | (2006.01) |
| *C08F 10/02* | (2006.01) |
| *B01J 31/02* | (2006.01) |
| *B01J 31/12* | (2006.01) |
| *B01J 31/14* | (2006.01) |
| *B01J 31/32* | (2006.01) |
| *C08F 110/02* | (2006.01) |
| *C08F 210/16* | (2006.01) |

(52) U.S. Cl.
CPC .......... *B01J 31/0231* (2013.01); *B01J 31/0212* (2013.01); *B01J 31/124* (2013.01); *B01J 31/143* (2013.01); *B01J 31/32* (2013.01); *C08F 10/02* (2013.01); *C08F 110/02* (2013.01); *C08F 210/16* (2013.01)

(58) Field of Classification Search
None
See application file for complete search history.

(56) References Cited

U.S. PATENT DOCUMENTS 5,192,731 A * 3/1993 Kioka et al. .................. 502/110
5,585,317 A 12/1996 Sacchetti et al.

FOREIGN PATENT DOCUMENTS

| | | |
|---|---|---|
| EP | 0 045 885 A | 2/1982 |
| EP | 0 240 254 A | 10/1987 |
| EP | 0 408 750 A | 1/1991 |
| EP | 0 480 435 A | 4/1992 |
| EP | 0 522 651 A | 1/1993 |
| WO | WO 91/08239 A1 | 6/1991 |

\* cited by examiner

*Primary Examiner* — Yun Qian

(74) *Attorney, Agent, or Firm* — Birch, Stewart, Kolasch & Birch, LLP

(57) ABSTRACT

Disclosed is a process for obtaining a solid catalyst component for ethylene polymerization and copolymerization, wherein a carrier of particulate silica (65 to 85% by weight) is impregnated with a catalytically active portion (15 to 35% by weight) including titanium, magnesium, chlorine, alkoxy groups and at least one organometallic compound of the groups 1, 2, 12 or 13 of the periodic table. Further, the invention refers to the solid catalyst component thus obtained and to a process for ethylene polymerization and copolymerization wherein is used said catalyst. The catalyst obtained is suitable for the production of ethylene homo- and copolymers as narrow molecular weight distribution high density polyethylene (NMWHDPE) and linear low density polyethylene (LLDPE) with controlled morphology and improved structure.

2 Claims, 6 Drawing Sheets

SOLID CATALYST COMPONENT FOR POLYMERIZATION AND COPOLYMERIZATION OF ETHYLENE AND PROCESS FOR OBTAINING THE SAME

This application is a Continuation-In-Part of application Ser. No. 10/518,443 filed Jul. 1, 2005, now abandoned which is the National phase of PCT International Application No. PCT/BR2002/000086 filed on Jun. 19, 2002, all of which are hereby expressly incorporated by reference into the present application.

The present invention relates to a solid catalyst component for ethylene polymerization and copolymerization, composed of a carrier of particulate silica and a catalytically active portion including titanium, magnesium, chlorine, alkoxy groups and at least one organometallic compound of the groups 1, 2, 12 or 13 of the periodic table. The process for producing the catalyst of the present invention comprises the steps of:

(a) impregnating an activated silica particles with a solution of an organometallic compound of the groups 1, 2, 12 or 13 of the periodic table, in an inert organic solvent;
(b) removing the supernatant liquid from the step (a);
(c) preparing a solution obtained by reacting at least one magnesium compound, selected from magnesium halides and magnesium alkoxides and at least one titanium compound selected from titanium alkoxides and titanium halogen alkoxides;
(d) impregnating the silica obtained in (b) using the solution prepared in (c);
(e) optionally reacting the solid obtained in (d) with a reducing agent;
(f) reacting the solid obtained in (d) or (e) with a halogenating agent;
(g) thermally treating the solid obtained in (f);
(h) washing the solid obtained in (g) with an inert organic solvent;
(i) optionally, washing the solid obtained in (h) with a solution of one or more organometallic compounds of the groups 1, 2, 12 or 13 of the periodic table.

The catalyst component obtained is especially suitable for the production of homo- and copolymers of ethylene as narrow molecular weight distribution high density polyethylene and linear low density polyethylene with controlled morphology and improved structure.

BACKGROUND OF THE INVENTION

1) Polymerization Process

The slurry or gas phase processes for the production of HDPE or LLDPE operating with low bulk density polymers require reactors with large volumes in order to obtain the necessary residence time. Particularly, in the gas phase reactors, the presence of fines with low bulk density causes problems. In fact, due to the friction of the polymer particles present in the reactor, the fines are especially prone to the formation of electrostatic charges and tend to deposit and adhere to the metallic walls. These stagnant deposits do not allow the exchange of the reaction heat and become hot spots, which can form layers of agglomerates containing eventually melt polymer. After a period of time chunks of agglomerates can fall down and plug the product discharge system. The described effects are enhanced when the reaction is carried out with a highly active catalyst.

In U.S. Pat. No. 5,410,002 a summary of patents on the above described phenomena is presented.

Therefore, it is crucial for the process that the catalyst used enables a total control of the polymer morphology resulting in product grains without fines, with high bulk density and good flowing properties.

Another very important aspect is that the catalyst must have a slow decaying time to permit the use of reactors in series. This arrangement makes possible the obtainment of bimodal products in addition to the reduction of the total volume of the reaction for the same production basis. Moreover, process operations with a different condition of reaction in at least two reactors in series, makes possible the use of catalysts with higher particle size thereby minimizing the formation of electrostatic charges.

2) Polymer Structure

The catalyst properties are fundamental to the polymer structure, mainly with respect to the molecular weight distribution, comonomer insertion in the polymeric chain and soluble content.

Each application used to achieve a final product from high density polyethylene (HDPE) or linear low density polyethylene (LLDPE) requires a specific polymeric structure.

To obtain a film with improved optical and mechanical properties and avoid blocking problems, a polymer having a narrow molecular weight distribution (MFR<27), is required. A large quantity of LLDPE applications requires products with a density=0.918 and a MI=0.7, and in most cases a xylene soluble content<10% is desired. Indeed, when the xylene soluble content of the polymer is present in a high concentration (>10%) and with a low molecular weight, this soluble content tends to migrate to the film surface causing blocking, in addition to the unsatisfactory optical properties (low gloss and high haze).

3) Ziegler-Natta Polyethylene Catalyst

Due to the strong competition existent in the polyethylene market, the catalyst production cost is a fundamental component. Therefore it is mandatory that the catalyst for producing polyethylene be manufactured by a simple route, from low cost raw material, without generating gaseous, liquid or solid effluents which are hard to treat.

U.S. Pat. No. 5,188,997 describes a synthesis process for Ziegler-Natta catalysts from silica and magnesium chloride alcoholate. The results reported demonstrate that this catalyst produces a polymer with low bulk density (0.23 to 0.30 g/ml) and with an intermediate molecular weight distribution (MFR 30.0 to 37.8).

U.S. Pat. No. 5,585,317 describes the synthesis of a catalyst supported on a magnesium chloride based carrier. The reported examples relates to the production of polymers having good morphology, characterized by the absence of fines and by the high bulk density which is, for LLDPE, produced between 0.32 and 0.40 g/ml and for HDPE, between 0.33 and 0.438 g/ml.

However, in the case of LLDPE production, the polymer obtained presents an undesired comonomer distribution in its chain, evidenced by the high xylene soluble content at different polymer densities. As an example, a polyethylene with 0.919 g/ml of polymer density has a xylene soluble content of 12.5% by weight.

SUMMARY OF THE INVENTION

The present invention relates to a solid catalyst component for ethylene polymerization and copolymerization, composed of a carrier of particulate silica and a catalytically active portion including titanium, magnesium, chlorine, alkoxy groups and at least one organometallic compound of the groups 1, 2, 12 or 13 of the periodic table. The process for producing the catalyst of the present invention comprises the steps of:

(a) impregnating activated silica particles with a solution of an organometallic compound of the groups 1, 2, 12 or 13 of the periodic table, in an inert organic solvent;
(b) removing the supernatant liquid from the step (a);
(c) preparing a solution obtained by reacting at least one magnesium compound, selected from magnesium halides and magnesium alkoxides and at least one titanium compound selected from titanium alkoxides and titanium halogen alkoxides;
(d) impregnating the silica obtained in (b) using the solution prepared in (c);
(e) optionally reacting the solid obtained in (d) with a reducing agent;
(f) reacting the solid obtained in (d) or (e) with a halogenating agent;
(g) thermally treating the solid obtained in (f);
(h) washing the solid obtained in (g) with an inert organic solvent;
(i) optionally, washing the solid obtained in (h) with a solution of one or more metal-alkyl halide compounds of the groups 1, 2, 12 or 13 of the periodic table.

Therefore, the present invention provides a catalyst especially suitable for the production of ethylene homo- and copolymers with a narrow molecular weight distribution, high density polyethylene (NMWHDPE) and a linear low density polyethylene (LLDPE) with controlled morphology and improved structure.

Additionally, the catalyst described and claimed in the present invention produces a NMWHDPE with a melt flow ratio (MFR) lower than 27 that is particularly suitable for thermoforming and injection applications.

Further, the catalyst described and claimed in the present invention produces a LLDPE with a low xylene soluble content due to the very good comonomer insertion allowing the production of films with superior optical properties and very low blocking.

The present invention further defines a catalyst that provides, when submitted to polymerization conditions, particles of polyethylene and ethylene copolymers having a high bulk density and containing a very small quantity of fines.

The present invention additionally provides a catalyst useful in liquid phase or in gas phase, ethylene polymerization processes.

The present invention further provides a catalyst useful in polymerization processes due to its high activity and low decay kinetics.

BRIEF DESCRIPTION OF THE DRAWING

The present invention will become more fully understood from the detailed description given hereinbelow and the accompanying drawings, which are given by way of illustration only, and thus are not limitative of the present invention, and wherein.

DETAILED DESCRIPTION

In the present specification, the expression Catalyst Decay means the half-life time of the active sites of a solid catalyst component which is measured as the time required for reaching 50% of the initial catalyst activity during a polymerization run. A catalyst with low decay kinetics has a half-life time preferably higher than 3 hours.

The present invention discloses a solid component obtained from the interaction of a reaction product between at least one magnesium compound, chosen from magnesium halides and magnesium alkoxides and at least one titanium compound chosen from titanium alkoxides and titanium halogen alkoxides, an activated silica impregnated with the organometallic compounds of the groups 1, 2, 12 or 13 and a halogenating agent, capable of interacting with the organometallic compounds of the groups 1, 2, 12 or 13, to give a solid catalyst component, which is highly active in the polymerization and copolymerization of ethylene. Optionally, a reducing agent can be used during the process of preparing the present catalyst component.

Figure 1:
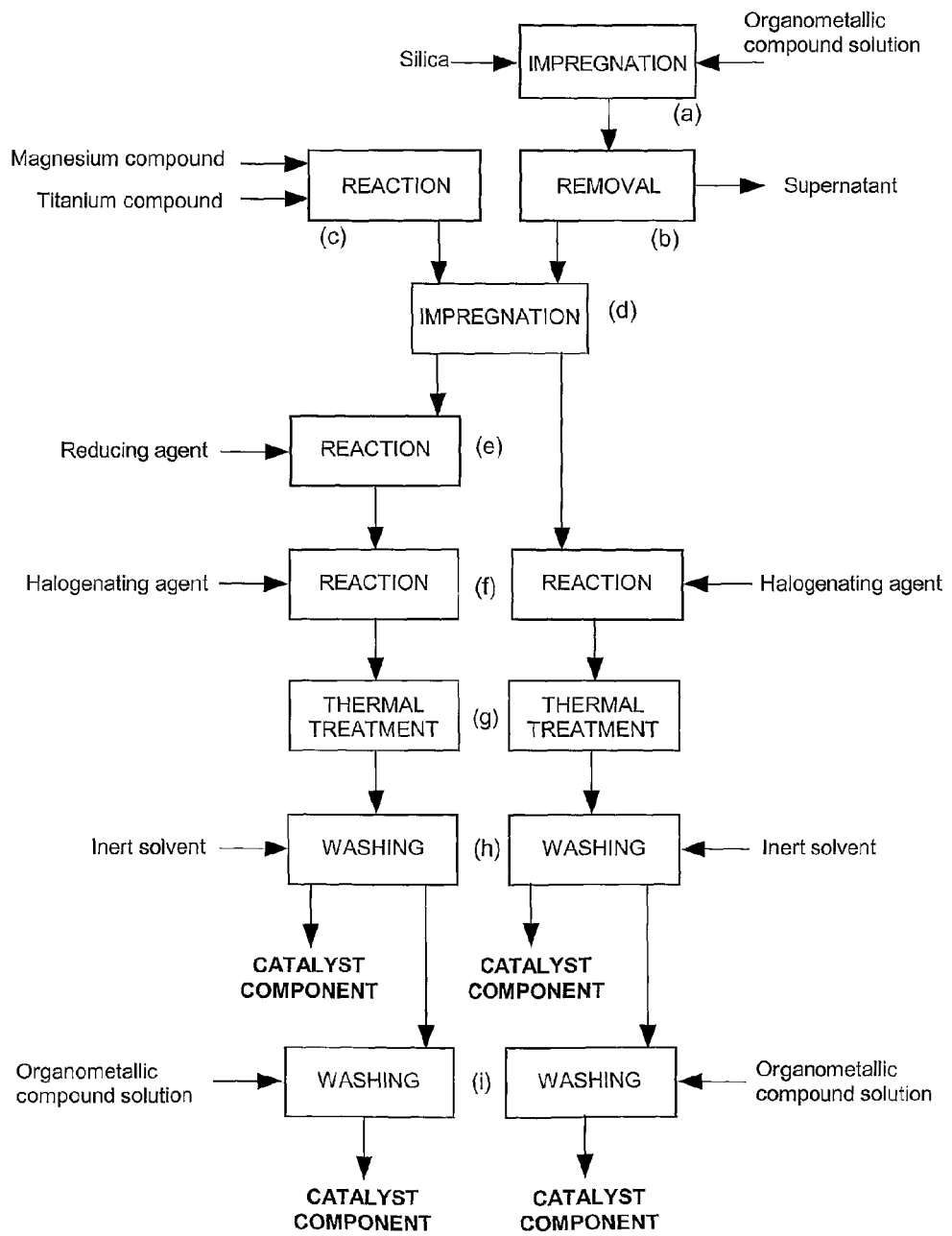
FIG. 1 herein is a flowchart, which illustrates the preferred embodiment of the present invention for preparing the solid catalyst component.

Accordingly, the present invention concerns a process for the preparation of a solid catalyst component for the polymerization of ethylene and the copolymerization of ethylene with alpha-olefins which comprises a carrier of silica particles (65 to 85% by weight) and a catalytically active portion (15 to 35% by weight) including titanium, magnesium, chlorine, alkoxy groups and at least one organometallic compound of the groups 1, 2, 12 or 13 of the periodic table. According to FIG. 1, this process comprises the following steps:

(a) impregnating an activated silica particles with a solution of an organometallic compound of the groups 1, 2, 12 or 13 of the periodic table, in an inert organic solvent;
(b) removing the supernatant liquid from the step (a);
(c) preparing a solution obtained by reacting at least one magnesium compound, selected from magnesium halides and magnesium alkoxides and at least one titanium compound selected from titanium alkoxides and titanium halogen alkoxides;
(d) impregnating the silica obtained in (b) using the solution prepared in (c);
(e) optionally reacting the solid obtained in (d) with a reducing agent;
(f) reacting the solid obtained in (d) or (e) with a halogenating agent;
(g) thermally treating the solid obtained in (f);
(h) washing the solid obtained in (g) with an inert organic solvent;
(i) optionally, washing the solid obtained in (h) with a solution of one or more organometallic compounds of the groups 1, 2, 12 or 13 of the periodic table.

In step (a) of the process according to the present invention, the preferable silica for this purpose is a microspheroidal, porous silica having an average particle size ranging from 10 to 120 µm, preferably between 15 and 100 µm, a $SiO_2$ contents of >90% by weight, a surface area ranging from 250 to 500 $m^2/g$, preferably between 300 and 400 $m^2/g$, a pore volume ranging from 1.0 to 2.0 ml/g, preferably between 1.5 and 1.8 ml/g, and an average pore diameter ranging from 10 to 40 nm, preferably between 20 and 30 nm. This silica should be submitted to an activation treatment before being impregnated, which can be carried out by heating the silica in an inert atmosphere, at a temperature ranging from 100 to 750° C., over a period from 1 to 20 hours. The amount of remaining OH on the silica surface after this treatment ranges from 0.1 to 2 mmoles OH per g of silica, preferably between 0.5 and 1.5 mmoles OH per g of silica.

The impregnation is preferably carried out by suspending 10 to 20 parts by weight of silica for each 100 parts by volume of a solution of an organometallic compound of the groups 1, 2, 12 or 13, in aliphatic hydrocarbons, and maintaining the solution with stirring at a temperature which ranges from room temperature to the boiling point of the solution of the organometallic compound of the groups 1, 2, 12 or 13, in aliphatic hydrocarbons, preferably at room temperature, over a period from 30 to 120 minutes, preferably between 50 and 60 minutes.

The organometallic compounds of groups 1, 2, 12 or 13 of the periodic table suitable for use in step (a) are alkyl compounds and alkyl halide compounds of metals belonging to these groups, and preferably aluminum, magnesium, lithium and zinc compounds. Specific examples of these compounds are trimethylaluminum, triethylaluminum (TEAL), methylaluminum dichloride, methylaluminum sesquichloride, isobutylaluminum dichloride, isobutylaluminum sesquichloride, ethylaluminum dichloride (EADC), diethylaluminum chloride (DEAC), ethylaluminum sesquichloride (EASC), tri-n-hexylaluminum (Tn-HAL), tri-n-octylaluminum (TnOAL), butyl ethylmagnesium (BEM), butyl octylmagnesium (BOMAG), methylmagnesium chloride and ethylmagnesium chloride. They can be used concentrated or preferably dissolved in the above organic solvent or in a different organic solvent chosen from aliphatic hydrocarbons.

Specific aliphatic hydrocarbons used as solvents for the above mentioned solution can have between 4 and 50 carbons, preferably between 6 and 20 carbons. Specific examples of these aliphatic hydrocarbons used as solvents are hexane, heptane, octane, isoparaffin, and the more preferably hexane and heptane.

In step (a) of the process, the impregnation step using the solution of organometallic compound of the groups 1, 2, 12 or 13, in aliphatic hydrocarbons, is carried out by using an amount of organometallic compound, ranging from 0.1 to 1 mmole of the organometallic solution per mmole of OH on the silica surface, preferably 0.3 to 0.7 mmoles of the organometallic solution per mmole of OH on the silica surface.

At the end of the impregnation treatment, the silica can be removed (step b) from the suspension by usual methods such as settling and siphoning, filtration or centrifugation. The operating temperature of this step can vary from room temperature to the boiling point of the aliphatic hydrocarbon used as the solvent, preferably at room temperature. The wet silica is directly used in the next step.

According to the present invention, in step (c) of the process, a liquid component from the reaction between at least one magnesium compound, chosen from magnesium halides and magnesium alkoxides and at least one titanium compound, chosen from titanium alkoxides and titanium halogen alkoxides, is prepared. Generally, it is necessary to heat the mixture of these compounds, at a temperature in the range of about 100° C. to about 200° C., preferably between 140° C. and 160° C., over a period of time from 1 to 100 hours, preferably between 10 and 30 hours. The mixture comprising said compounds has to be prepared under turbulent stirring and under inert conditions. After the formation of the product obtained from the reaction between these compounds, which is noted by the disappearance of the solid suspension, the temperature of the obtained liquid product can be reduced to ambient temperature without precipitation of any solid. This liquid component is diluted in an inert organic solvent to form a clear solution. Specific organic solvents used for the above mentioned solution can be aliphatic hydrocarbons having between 4 and 50 carbons, preferably between 6 and 20 carbons. Specific examples of these aliphatic hydrocarbons used as organic solvents are: hexane, heptane, octane, isoparaffin, most preferably hexane and heptane.

The magnesium compounds suitable for the purpose of the invention are those having the formulae $MgX_2$ or $Mg(OR)_2$, wherein R represents a linear or branched alkyl group, containing from 1 to 10 carbons and X represents a halogen atom and preferably a chlorine atom. Specific examples of magnesium compounds are magnesium dichloride, magnesium diethylate, magnesium di-n-butylate, magnesium diisopropylate and magnesium diisobutylate.

The amount of magnesium compound used in the above preparation corresponds to the amount ranging from 0.0024 to 0.24 g of magnesium per g of silica, preferably between 0.0042 and 0.042 g of magnesium per g of silica.

The titanium compounds most suited for the purpose are alkoxides and chloroalkoxides, containing from 1 to 4 carbons in the alkoxide portion. Specific examples of these compounds are: titanium tetra-n-propylate, titanium tetra-n-butylate, titanium tetra-1-propylate, titanium tetra-1-butylate and the corresponding titanium mono- or di-chloroalkoxides.

The amount of titanium compound used in the above preparation corresponds to an amount ranging from 0.01 to 1 g of titanium per g of silica, preferably between 0.0175 and 0.175 g of titanium per g of silica.

In general, when preparing the solution of the step (c), titanium is used in such an amount that the molar ratio Ti/Mg varies within the range of 0.3 to 4, and preferably within the range of 0.5 to 2.

In step (d) the silica obtained in step (b) is suspended in an inert organic solvent, such as a hydrocarbon solvent of the aliphatic type, preferably the same used in the previous steps and the dissolved product prepared in step (c) is added to the suspension. The impregnation is carried out by suspending 100 parts by weight of silica, obtained on step (b), for each 5 to 200 parts by volume of the component prepared on step (c) and after dilution in the inert organic solvent. The suspension is maintained under stirring at a temperature that ranges from room temperature to the boiling point of the mixture, preferably at 60° C., over a period of time from 30 to 180 minutes, preferably between 50 and 60 minutes. In this way a solid component suspended in an inert organic solvent is obtained.

Optionally the solid component obtained in step (d) can be submitted to reducing conditions in a step (e). Said result is obtained, for example, by using reducing agents, such as Na-alkyls, Li-alkyls, Zn-alkyls, Mg-alkyls and corresponding aryl-derivatives, Grignard compounds of the type RMgX, wherein R represents a linear or branched alkyl group, containing from 1 to 10 carbons or aryl-derivatives and X represents a halogen atom and preferably a chlorine atom, Al-alkyl halide compounds or by using reducing agents such as silicon compounds. Particularly effective silicone compounds are the polymethylhydrosiloxanes in which the monomer unit has the general formula $[-HSiR-O-]_n$, wherein R is H, halogen, alkyl with 1 to 10 carbon atoms, aryl with 6 to 10 carbon atoms, alkoxyl with 1 to 10 carbon atoms, aryloxyl with 6 to 10 carbon atoms or carboxyl with 1 to 10 carbon atoms, and n is a degree of polymerization that ranges between 5 and 100. Specific examples of such polymethylhydrosiloxanes (PMHS) include the compounds: $(CH_3)_3SiO[(CH_3)HSiO]_nSi(CH_3)_3$, $(CH_3HSiO)_4$, $(CH_3HSiO)_3$, $H_3Si-O-SiH_2-OSiH_3$, phenylhydropolysiloxanes in which the hydrogen atoms can be partially replaced by methyl groups.

Other silicon compounds useful as reducing agents in the practice of this invention are: silanes ($Si_mH_{2m+2}$, in which m is a number equal to or higher than 1), alkyl-silanes or aryl-silanes ($R_xSiH_{4-x}$, in which R is alkyl or aryl and x is a number varying from 1 to 3) and alkoxy-silanes or aryloxy-silanes ($RO_xSiH_{4-x}$, in which R is alkyl or aryl and x is a number varying from 1 to 3).

The reducing agent chosen from the above examples, preferably polymethylhydrosiloxanes (PMHS), is added to the solid obtained in the step (d), dissolved preferably in the same inert organic solvent used for the reaction suspension. This addition is carried out slowly over a period of time from 30 to 180 minutes, preferably between 50 and 80 minutes and the solid suspension is maintained under stirring at a temperature ranging from room temperature to the boiling point of the aliphatic hydrocarbon used as solvent, preferably at 60° C.

The amount of reducing agent that can be used in step (e) corresponds to the amount ranging from 0 to 2 moles per mole of titanium, preferably between 0 and 0.1 mole per mole of titanium. It has been observed, in the experiments, that the quantity used of this reducing agent can control the amount of titanium fixed on silica at the final catalyst.

In the next step of the process according to the present invention, the suspension obtained in (d) or (e), which is still under stirring, is put in contact and interacted with one or more halogenating agents.

Halogenating agents useful in the practice of the present invention can be either liquid or gaseous materials, pure or preferably dissolved in an inert organic solvent. Representative but non-exhaustive examples of halogenating agents useful in the present invention are methylaluminum dichloride, methylaluminum sesquichloride, isobutylaluminum dichloride, isobutylaluminum sesquichloride, ethylaluminum dichloride (EADC), diethylaluminum chloride (DEAC), ethylaluminum sesquichloride (EASC), $SiCl_4$, $SnCl_4$, HCl, $Cl_2$, $HSiCl_3$, aluminum chloride, ethylboron dichloride, boron chloride, diethylboron chloride, $HCCl_3$, $PCl_3$, $POCl_3$, acetyl chlorides, thionyl chloride, sulfur chloride, methyl trichlorosilane, dimethyl dichlorosilane, $TiCl_4$, $VCl_4$, $CCl_4$, t-butyl chloride, n-butyl chloride, chloroform, 1,1,1-trichloroethane, 1,1,2-trichloroethane, 1,2-dichloroethane and dichloromethane.

The preferred halogenating agents are chlorinating agents and of these $SiCl_4$, $SnCl_4$, HCl, $Cl_2$, $HSiCl_3$, methyl trichlorosilane, dimethyl dichlorosilane, t-butyl chloride, n-butyl chloride, chloroform, 1,1,1-trichloroethane, 1,1,2-trichloroethane, 1,2-dichloroethane and dichloromethane are preferred, most preferably $SiCl_4$.

The amount of halogenating agent used in the step (f) of the process corresponds to the amount ranging from 0.5 to 3 moles of halogenating agent per mole of titanium, preferably between 1 and 1.8 moles of halogenating agent per mole of titanium.

The time necessary for halogenating Ti-alkoxide and optionally Mg-alkoxide varies from 0.5 hour to 5 hours, preferably from 1.5 hours to 2.5 hours. The temperature of the solid suspension halogenation ranges from room temperature to the boiling point of the aliphatic hydrocarbon used as solvent, preferably at 60° C.

According to the present invention, in step (g) of the process, the solid obtained in (f) is kept under higher temperature that depends on the inert organic solvent used.

The time necessary for this thermal treatment of the solid obtained in step (f) ranges from 0.5 hour to 5 hours, preferably from 3 to 5 hours. The ideal temperature for this purpose depends on the organic solvent used and it can be conducted from 60° C. to 120° C., preferably from 60° C. to 75° C., when hexane is used as the organic solvent.

At the step (h) after the thermal treatment, the solid can be separated from the suspension, for example by settling and siphoning, filtration or centrifugation, washed with an inert organic solvent, preferably hexane, and then dried. The washing temperature can vary from room temperature to the boiling point of the aliphatic hydrocarbon used as solvent, preferably at room temperature.

Optionally, the solid obtained in (h) is washed with a solution of organometallic compounds of the groups 1, 2, 12 or 13. More specifically, in the optional step (i) the solid obtained in step (h) is suspended in an inert organic solvent such as hexane or heptane, and it is put in contact with one or more organometallic compounds of the groups 1, 2, 12 or 13 of the periodic table, preferably metal-alkyl compounds or metal-alkyl halide compounds belonging to these groups, in special aluminum, magnesium, lithium and zinc compounds. Specific examples of these compounds are methylaluminum dichloride, methylaluminum sesquichloride, isobutylaluminum dichloride, isobutylaluminum sesquichloride, ethylaluminum dichloride (EADC), diethylaluminum chloride (DEAC), ethylaluminum sesquichloride (EASC), tri-n-hexylaluminum (Tn-HAL), tri-n-octylaluminum (TnOAL). They can be used concentrated or preferably dissolved in the above organic solvent or in a different organic solvent chosen from aliphatic hydrocarbons. The process is carried out at a temperature ranging from room temperature to the boiling point of the organic solvent used as solvent, preferably at room temperature, for a period of time that can vary from 10 minutes to 24 hours, preferably from 40 minutes to 5 hours.

When using more than one organometallic compound in the step (i), the different compounds can be fed in the same solution or in individual solutions, at the same time or in subsequent additions.

The amount of the metal-alkyl halide compound of the groups 1, 2, 12 or 13 or metal-alkyl compound of the groups 1, 2, 12 or 13, used in the step (i) of the process corresponds to the amount ranging from 0 to 3 g of the corresponding metal-alkyl halide compound of the groups 1, 2, 12 or 13 or metal-alkyl compound of the groups 1, 2, 12 or 13, per g of dry catalyst component obtained, preferably between 0.05 and 1 g of the corresponding metal-alkyl halide compound of the groups 1, 2, 12 or 13 or metal-alkyl compound of the groups 1, 2, 12 or 13, per g of dry catalyst component obtained.

The use of inert organic solvents, most specifically aliphatic hydrocarbons, in all process steps of the present invention brings another important feature to the solid catalyst component characteristics. The solid catalyst component obtained is completely free of residual polar solvents, such as ethanol, and their derivatives in its final composition.

The titanium amount that remains fixed on the solid catalyst component may reach up to 10% by weight, expressed as the Ti metal content, and it is preferably comprised between 0.5 and 2% by weight.

The magnesium amount that remains fixed on the solid catalyst component may reach up to 6% by weight, expressed as the Mg metal content, and it is preferably comprised between 0.3 and 3.0% by weight.

The chlorine amount that remains fixed on the solid catalyst component may reach up to 20% by weight, expressed as the Cl contents, and it is preferably between 5 and 12% by weight.

The alkoxy amount that remains fixed on the solid catalyst component may reach up to 20% by weight and it is preferably between 3 and 8% by weight.

The amount of organometallic compound of the groups 1, 2, 12 or 13 that remains fixed on the solid catalyst component may reach up to 5% by weight, expressed as the metal contents, and it is preferably between 0.3 and 3% by weight. This organometallic compound of the groups 1, 2, 12 or 13 are metal-alkyl compounds or metal-alkyl halide compounds belonging to these groups, in special organoaluminum, organomagnesium, organolithium and organozinc compounds, pure or in mixtures.

The particle size distribution of the solid catalyst component of the present invention is very close to the silica used as carrier and, as consequence, its average particle size ranges also from 10 to 120 μm. The solid catalyst component surface area ranges from 80 to 300 m$^2$/g and its pore volume ranges from 0.1 to 1.0 ml/g.

The catalyst component of the present invention is suitable for using in liquid phase or gas phase, ethylene polymerization process. The co-catalyst used in the polymerization process is an alkyl-aluminum, preferably trimethyl aluminum or triethyl aluminum. The mass ratio co-catalyst:catalyst in the polymerization process is between 0.5:1 and 6.0:1.

An important feature is its ability to produce, when submitted to polymerization conditions, particles of homo and copolymers of ethylene with controlled morphology having high bulk density and containing a very small quantity of fines. This feature allows the use of this catalyst in a process where the catalyst can be fed directly into the polymerization reactor. Particular forms to feed the catalyst are in dry bulk powder, in paste, in oil suspension or in solvent suspension. As an alternative the catalyst can be prepolymerized with ethylene or propylene and optionally with a comonomer before being fed into the reactor.

Another important feature of the present invention is its tolerance to the high electrostatic charges occurring in gas phase reactors. This feature helps to prevent the formation of polymer sheets or agglomerates on the reactor walls. The good catalytic yield and the low decay kinetics observed for the present invention, allows its use in most polymerization processes, including processes operating in more than one reactor in series.

A further feature characteristic of the catalyst of the present invention is when using a microspheroidal silica as support the catalyst obtained has also a spheroidal morphology and in consequence a polymer product with good morphology and flowability is obtained.

The catalyst component of the present invention is advantageously used in the polymerization of ethylene and mixtures thereof with alpha-olefins $CH_2=CHR$, wherein R is an alkyl or cicloalkyl or aryl radical with 1-12 carbon atoms because it has a high activity and low decay kinetics. In particular, it is used in the preparation of:

High density polyethylenes (HDPE, having a density greater than 0.940 g/cm$^3$), particularly with narrow molecular weight distribution (MFR<27), including homopolymers of ethylene and copolymers of ethylene with one or more alpha-olefins having from 3 to 14 carbon atoms. These products are particularly suitable for thermoforming and injection applications;

Linear medium density and linear low density polyethylenes (LMDPE and LLDPE, having a density lower than 0.940 g/cm$^3$) most specifically very low and ultra low density linear polyethylenes (VLDPE and ULDPE, having a density lower than 0.920 g/cm$^3$ and as low as 0.880 g/cm$^3$) consisting of copolymers of ethylene with one or more alpha-olefins having from 3 to 14 carbon atoms, having a content of units derived from ethylene greater than approximately 80% by weight. These products have an improved structure due to the very good comonomer insertion and, in most cases, they have also a narrow molecular weight distribution (MFR<27). Hence the low xylene soluble contents are obtained, allowing the production of films with superior optical properties and very low blocking. The LMDPE products are particularly useful for rotomolding applications;

Elastomeric copolymers of ethylene and propylene and elastomeric terpolymers of ethylene and propylene with minor amounts of a diene, having a content of units derived from ethylene comprised between about 30 and 70% by weight.

EXAMPLES

The present invention is now explained in more details by means of the following Examples, which should not be understood as limiting the scope of the invention.

The properties here indicated are determined according to the following methods:

Surface area and pore volume: determined by nitrogen adsorption according to the B.E.T methodology using a "Micromeritics ASAP 2010" apparatus.

Size of the catalyst particles: determined according to a method based on the principle of optical diffraction of monochromatic laser light, using the "Malvern Instr. 2600" apparatus.

MIE melt index: ASTM D-1238, condition E
MIF melt index: ASTM D-1238, condition F
MFR melt flow ratio: MIF/MIE Flowability: it is the time required by 100 g of polymer to flow through a stainless steel funnel (outlet opening diameter of 12.7 mm and side walls at 20° to the vertical).

Bulk density: ASTM D-1895
Morphology: optical microscopy.
Fraction soluble in xylene: determined at 25° C.
Comonomer contents: percentage by weight, as determined via I.R. spectra.
Polymer density: ASTM D-1928-C and ASTM D-1505.
Haze: ASTM-D 1003
Gloss: ASTM-D 2457
Blocking: ASTM-D 3354

The haze, gloss and blocking measurements are made in films of 80 μm of thickness with 1500 ppm of an amorphous silica as additive.

Particle size distribution of the particulate polymer: ASTM-D 1921

In the following experimental examples, which are intended to provide a better illustration of the present invention, an activated microspheroidal silica carrier is used, having an average particle size of 40 μm, a SiO$_2$ contents superior to 99% by weight, a surface area of 290 m$^2$/g and a pore volume of 1.62 ml/g. The triethylaluminum (TEAL) and the diethylaluminum chloride (DEAC) are available from Akzo Nobel Co. The titanium tetra-n-butylate is available from Merck. The magnesium chloride is supplied by from Maruyasu Co. The hexane available from Phillips Petroleum was purified with molecular sieves and nitrogen to remove oxygen and water. All solid component preparations were carried out in an inert atmosphere.

Preparation of the Solid Catalyst Component

Example 1

In a 5 liter flask fitted with a mechanical stirrer and previously purged with nitrogen were fed 44 g (0.462 moles) of anhydrous $MgCl_2$ and 330 ml (0.969 moles) of $Ti(OBu)_4$. This mixture was allowed to stir at 300 rpm and heated to 150° C. for about 12 hours in order to have the solids completely dissolved, thereby a clear liquid product was obtained. This resulting liquid was cooled down to 40° C. and under gently stirring at 150 rpm, it was diluted with 3200 ml of anhydrous hexane. Into this solution kept at 40° C. and under the same stirring, 250 g of the silica support were added. This silica was previously dehydrated and treated with 19 ml (0.139 moles) of triethylaluminum diluted in anhydrous hexane, for 50 minutes and at room temperature. Once the addition of the silica is completed, the mixture was heated to 60° C. and kept at this temperature for 1 hour. Into this mixture, kept at 60° C. and under gently stirring, a solution consisting of 100 ml of anhydrous hexane and 192 ml of PMHS (0.085 moles) was dropped into it over a period of time of 1.5 hours. At the end of the addition, stirring was continued for 2 hours at a temperature of 60° C. To this mixture a solution of 200 ml of anhydrous hexane and 184 ml of $SiCl_4$ (1.606 moles) was dropped over a period of time of 1 hour. At the end of the addition, stirring was continued for 3.5 hours at a temperature of 60° C. The temperature of the mixture was then brought to 65° C. and kept for additional 2 hours. After cooling the mixture to room temperature, the stirring was stopped to have the solid settled. The supernatant liquid was removed, the solid was repeatedly washed with anhydrous hexane and then dried at 60° C. under nitrogen flow thus giving 390 g of a reddish powder.

The chemical and physical characteristics of the resulting reddish powder were as follows:
Total Titanium=7.0% (by weight)
Mg=2.0% (by weight)
$SiO_2$=75.9% (by weight)
Al=0.5% (by weight)
Cl=10.9% (by weight)
OBu=4.1% (by weight)
Surface Area (B.E.T.)=200 $m^2/g$
Pore Volume (B.E.T.)=0.45 $cm^3/g$ Example 2

In a 5 liter flask fitted with a mechanical stirrer and previously purged with nitrogen were fed 5.28 g (0.055 moles) of anhydrous $MgCl_2$ and 39.6 ml (0.116 moles) of $Ti(OBu)_4$. This mixture was allowed to stir at 300 rpm and heated to 150° C. for about 12 hours in order to have the solids completely dissolved, thereby a clear liquid product was obtained. This resulting liquid was cooled down to 40° C. and under gently stirring at 150 rpm, it was diluted with 3200 ml of anhydrous hexane. Into this solution kept at 40° C. and under the same stirring, 300 g of the silica support were added. This silica was previously dehydrated and treated with 23 ml (0.167 moles) of triethylaluminum diluted in anhydrous hexane, for 50 minutes and at room temperature. Once the addition of the silica is completed, the mixture was heated to 60° C. and kept at this temperature for 1 hour. Into this mixture, kept at 60° C. and under gently stirring, a solution consisting of 100 ml of anhydrous hexane and 23 ml of PMHS (0.010 moles) was dropped into it over a period of time of 1.5 hours. At the end of the addition, stirring was continued for 2 hours at a temperature of 60° C. To this mixture a solution of 100 ml of anhydrous hexane and 22 ml of $SiCl_4$ (0.192 moles) was dropped over a period of 1 hour. At the end of the addition, stirring was continued for 3.5 hours at a temperature of 60° C. The temperature of the mixture was then brought to 65° C. and kept for additional 2 hours. After cooling the mixture to room temperature, the stirring was stopped to have the solid settled. The supernatant liquid was removed, the solid was repeatedly washed with anhydrous hexane and finally dried at 60° C. under nitrogen flow thus giving 360 g of a light reddish powder.

The chemical and physical characteristics of the resulting reddish powder were as follows:
Total Titanium=1.4% (by weight)
Mg=0.5% (by weight)
$SiO_2$=81.0% (by weight)
Al=1.4% (by weight)
Cl=8.4% (by weight)
OBu=6.3% (by weight)
Surface Area (B.E.T.)=150 $m^2/g$
Pore Volume (B.E.T.)=0.35 $cm^3/g$ Example 3

In a 5 liter flask fitted with a mechanical stirrer and previously purged with nitrogen were fed 5.28 g (0.055 moles) of anhydrous $MgCl_2$ and 39.6 ml (0.116 moles) of $Ti(OBu)_4$. This mixture was allowed to stir at 300 rpm and heated to 150° C. for about 12 hours in order to have the solids completely dissolved, thereby a clear liquid product was obtained. This resulting liquid was cooled down to 40° C. and under gently stirring at 150 rpm, it was diluted with 3200 ml of anhydrous hexane. Into this solution kept at 40° C. and under the same stirring, 300 g of the silica support were added. This silica was previously dehydrated and treated with 23 ml (0.167 moles) of triethylaluminum diluted in anhydrous hexane, for 50 minutes and at room temperature. Once the addition of the silica is completed, the mixture was heated to 60° C. and kept at this temperature for 1 hour. Into this mixture, kept at 60° C. and under gently stirring, a solution consisting of 100 ml of anhydrous hexane and 23 ml of PMHS (0.010 moles) was dropped into it over a period of time of 1.5 hours. At the end of the addition, stirring was continued for 2 hours at a temperature of 60° C. To this mixture a solution of 100 ml of anhydrous hexane and 22 ml of $SiCl_4$ (0.192 moles) was dropped over a period of time of 1 hour. At the end of the addition, stirring was continued for 3.5 hours at a temperature of 60° C. The temperature of the mixture was then brought to 65° C. and kept for additional 2 hours. After cooling the mixture to room temperature, the stirring was stopped to have the solid settled. The supernatant liquid was removed, the solid was repeatedly washed with anhydrous hexane. The solid thus obtained was again suspended in 2200 ml of anhydrous hexane and then 31.4 g of DEAC (0.260 moles) in 200 ml of anhydrous hexane were added to the resulting suspension under gently stirring. Contact was maintained for 50 min at room temperature. Finally, the supernatant liquid was removed and the solid was dried at 60° C. under nitrogen flow thus giving 300 g of a brown-reddish powder.

The chemical and physical characteristics of the resulting reddish powder were as follows:
Total Titanium=1.2% (by weight)
Mg=0.3% (by weight)
$SiO_2$=81.0% (by weight)
Al=1.8% (by weight)
Cl=7.0% (by weight)
OBu=7.7% (by weight)
Surface Area (B.E.T.)=155 $m^2/g$
Pore Volume (B.E.T.)=0.36 $cm^3/g$ Example 4

In a 5 liter flask fitted with a mechanical stirrer and previously purged with nitrogen were fed 5.28 g (0.055 moles) of anhydrous $MgCl_2$ and 39.6 ml (0.116 moles) of $Ti(OBu)_4$. This mixture was allowed to stir at 300 rpm and heated to 150° C. for about 12 hours in order to have the solids completely dissolved, thereby a clear liquid product was obtained. This resulting liquid was cooled down to 40° C. and under gently stirring at 150 rpm, it was diluted with 3200 ml of anhydrous hexane. Into this solution kept at 40° C. and under the same stirring, 300 g of the silica support were added. This silica was previously dehydrated and treated with 23 ml (0.167 moles) of triethylaluminum diluted in anhydrous hexane, for 50 minutes and at room temperature. Once the addition of the silica is completed, the mixture was heated to 60° C. and kept at this temperature for 1 hour. To this mixture a solution of 100 ml of anhydrous hexane and 22 ml of $SiCl_4$ (0.192 moles) was dropped over a period of time of 1 hour. At the end of the addition, stirring was continued for 3.5 hours at a temperature of 60° C. The temperature of the mixture was then brought to 65° C. and kept for additional 2 hours. After cooling the mixture to room temperature, the stirring was stopped to have the solid settled. The supernatant liquid was removed, the solid was repeatedly washed with anhydrous hexane and then dried at 60° C. under nitrogen flow, thus giving 390 g of a light reddish powder.

The chemical and physical characteristics of the resulting reddish powder were as follows:
Total Titanium=1.5% (by weight)
Mg=0.3% (by weight)
$SiO_2$=81.2% (by weight)
Al=1.2% (by weight)
Cl=7.2% (by weight)
OBu=7.6% (by weight)
Surface Area (B.E.T.)=153 $m^2/g$
Pore Volume (B.E.T.)=0.36 $cm^3/g$ Example 5

In a 5 liter flask fitted with a mechanical stirrer and previously purged with nitrogen were fed 52.8 g (0.554 moles) of anhydrous $MgCl_2$ and 396 ml (1.163 moles) of $Ti(OBu)_4$. This mixture was allowed to stir at 300 rpm and heated to 150° C. for about 12 hours in order to have the solids completely dissolved, thereby a clear liquid product was obtained. This resulting liquid was cooled down to 40° C. and under gently stirring at 150 rpm, it was diluted with 3200 ml of anhydrous hexane. Into this solution kept at 40° C. and under the same stirring, 300 g of the silica support were added. This silica was previously dehydrated and treated with 23 ml (0.167 moles) of triethylaluminum diluted in anhydrous hexane, for 50 minutes and at room temperature. Once the addition of the silica is completed, the mixture was heated to 60° C. and kept at this temperature for 1 hour. To this mixture a solution of 200 ml of anhydrous hexane and 221 ml of $SiCl_4$ (1.929 moles) was dropped over a period of time of 1 hour. At the end of the addition, stirring was continued for 3.5 hours at a temperature of 60° C. The temperature of the mixture was then brought to 65° C. and kept for additional 2 hours. After cooling the mixture to room temperature, the stirring was stopped to have the solid settled. The supernatant liquid was removed, the solid was repeatedly washed with anhydrous hexane and then dried at 60° C. under nitrogen flow thus giving 300 g of a light reddish powder.

The chemical and physical characteristics of the resulting reddish powder were as follows:
Total Titanium=1.7% (by weight)
Mg=2.4% (by weight)
$SiO_2$=76.7% (by weight)
Al=0.8% (by weight)
Cl=10.0% (by weight)
OBu=7.5% (by weight)
Surface Area (B.E.T.)=185 $m^2/g$
Pore Volume (B.E.T.)=0.55 $cm^3/g$ Example 6

In a 5 liter flask fitted with a mechanical stirrer and previously purged with nitrogen were fed 52.8 g (0.554 moles) of anhydrous $MgCl_2$ and 396 ml (1.163 moles) of $Ti(OBu)_4$. This mixture was allowed to stir at 300 rpm and heated to 150° C. for about 12 hours in order to have the solids completely dissolved, thereby a clear liquid product was obtained. This resulting liquid was cooled down to 40° C. and under gently stirring at 150 rpm, it was diluted with 3200 ml of anhydrous hexane. Into this solution kept at 40° C. and under the same stirring, 300 g of the silica support were added. This silica was previously dehydrated and treated with 23 ml (0.167 moles) of triethylaluminum diluted in anhydrous hexane, for 50 minutes and at room temperature. Once the addition of the silica is completed, the mixture was heated to 60° C. and kept at this temperature for 1 hour. To this mixture a solution of 200 ml of anhydrous hexane and 221 ml of $SiCl_4$ (1.929 moles) was dropped over a period of time of 1 hour. At the end of the addition, stirring was continued for 3.5 hours at a temperature of 60° C. The temperature of the mixture was then brought to 65° C. and kept for additional 2 hours. After cooling the mixture to room temperature, the stirring was stopped to have the solid settled. The supernatant liquid was removed, the solid was repeatedly washed with anhydrous hexane. The solid thus obtained was again suspended in 2200 ml of anhydrous hexane and then 30 g of DEAC (0.249 moles) in 200 ml of anhydrous hexane were added to the resulting suspension under gently stirring. Contact was maintained for 50 min at room temperature. Finally, the supernatant liquid was removed and the solid was dried at 60° C. under nitrogen flow thus giving 400 g of a brown-reddish powder.

The chemical and physical characteristics of the resulting reddish powder were as follows:
Total Titanium=1.8% (by weight)
Mg=2.7% (by weight)
$SiO_2$=75.5% (by weight)
Al=1.4% (by weight)
Cl=12.0% (by weight)
OBu=5.6% (by weight)
Surface Area (B.E.T.)=180 $m^2/g$
Pore Volume (B.E.T.)=0.53 $cm^3/g$ Example 7

In a 5 liter flask fitted with a mechanical stirrer and previously purged with nitrogen were fed 24 g (0.252 moles) of anhydrous $MgCl_2$ and 180 ml (0.528 moles) of $Ti(OBu)_4$. This mixture was allowed to stir at 300 rpm and heated to 150° C. for about 12 hours in order to have the solids completely dissolved, thereby a clear liquid product was obtained. This resulting liquid was cooled down to 40° C. and under gently stirring at 150 rpm, it was diluted with 3200 ml of anhydrous hexane. Into this solution kept at 40° C. and under the same stirring, 300 g of the silica support were added. This silica was previously dehydrated and treated with 23 ml (0.167 moles) of triethylaluminum diluted in anhydrous hexane, for 50 minutes and at room temperature. Once the addition of the silica is completed, the mixture was heated to 60° C. and kept at this temperature for 1 hour. To this mixture a solution of 100 ml of anhydrous hexane and 100 ml of $SiCl_4$ (0.873 moles) was dropped over a period of time of 1 hour. At the end of the addition, stirring was continued for 3.5 hours at a temperature of 60° C. The temperature of the mixture was then brought to 65° C. and kept for additional 2 hours. After cooling the mixture to room temperature, the stirring was stopped to have the solid settled. The supernatant liquid was removed, the solid was repeatedly washed with anhydrous hexane and then dried at 60° C. under nitrogen flow thus giving 360 g of a reddish powder.

The chemical and physical characteristics of the resulting reddish powder were as follows:
Total Titanium=2.1% (by weight)
Mg=1.4% (by weight)
$SiO_2$=78.3% (by weight)
Al=0.9% (by weight)
Cl=8.7% (by weight)
OBu=7.6% (by weight)
Surface Area (B.E.T.)=193 $m^2$/g
Pore Volume (B.E.T.)=0.62 $cm^3$/g

Example 8

In a 5 liter flask fitted with a mechanical stirrer and previously purged with nitrogen were fed 24 g (0.252 moles) of anhydrous $MgCl_2$ and 180 ml (0.528 moles) of $Ti(OBu)_4$. This mixture was allowed to stir at 300 rpm and heated to 150° C. for about 12 hours in order to have the solids completely dissolved, thereby a clear liquid product was obtained. This resulting liquid was cooled down to 40° C. and under gently stirring at 150 rpm, it was diluted with 3200 ml of anhydrous hexane. Into this solution kept at 40° C. and under the same stirring, 300 g of the silica support were added. This silica was previously dehydrated and treated with 23 ml (0.167 moles) of triethylaluminum diluted in anhydrous hexane, for 50 minutes and at room temperature. Once the addition of the silica is completed, the mixture was heated to 60° C. and kept at this temperature for 1 hour. To this mixture a solution of 100 ml of anhydrous hexane and 100 ml of $SiCl_4$ (0.873 moles) was dropped over a period of time of 1 hour. At the end of the addition, stirring was continued for 3.5 hours at a temperature of 60° C. The temperature of the mixture was then brought to 65° C. and kept for additional 2 hours. After cooling the mixture to room temperature, the stirring was stopped to have the solid settled. The supernatant liquid was removed, the solid was repeatedly washed with anhydrous hexane. The solid thus obtained was again suspended in 2200 ml of anhydrous hexane and then 30 g of DEAC (0.249 moles) in 200 ml of anhydrous hexane were added to the resulting suspension under gently stirring. Contact was maintained for 50 min at room temperature. Finally, the supernatant liquid was removed and the solid was dried at 60° C. under nitrogen flow thus giving 350 g of a brown-reddish powder.

The chemical and physical characteristics of the resulting reddish powder were as follows:
Total Titanium=2.0% (by weight)
Mg=1.5% (by weight)
$SiO_2$=76.8% (by weight)
Al=1.7% (by weight)
Cl=10.3% (by weight)
OBu=6.7% (by weight)
Surface Area (B.E.T.)=202 $m^2$/g
Pore Volume (B.E.T.)=0.48 $cm^3$/g.

The produced catalyst demonstrates the following properties when analyzed with X-ray photoelectron spectroscopy, UV-VIS spectroscopy and XANES spectroscopy.

X-Ray Photoelectron Spectroscopy (XPS)

Triethylaluminum (TEAL) was used during polymerization, therefore, the FWHM was analyzed with or without the reaction with TEAL.

| CATALYST | TEAL REACTION | BINDING ENERGY (Ti 2p 3/2) | FWHM (eV) |
|---|---|---|---|
| Example 8 | NO | 458.65 | 3.0 |
|  | YES | n.a. | 3.0 | n.a.—not analyzed.

From the XPS spectra, the intensity of the signals and the intensity ratio of the signals of elements such as C, Si, Ti and Mg were observed and analyzed as shown below:

| INTENSITY OF THE SIGNALS | | | | INTENSITY RATIO OF THE SIGNALS | | |
|---|---|---|---|---|---|---|
| C 1s | Si 2p | Ti 2p 3/2 | Mg KLL | Mg/Si | Ti/Si | Mg/Ti |
| 4300 | 5754 | 2350 | 1343 | 0.23 | 0.41 | 0.57 |

UV-VIS Spectroscopy

Figure 3:
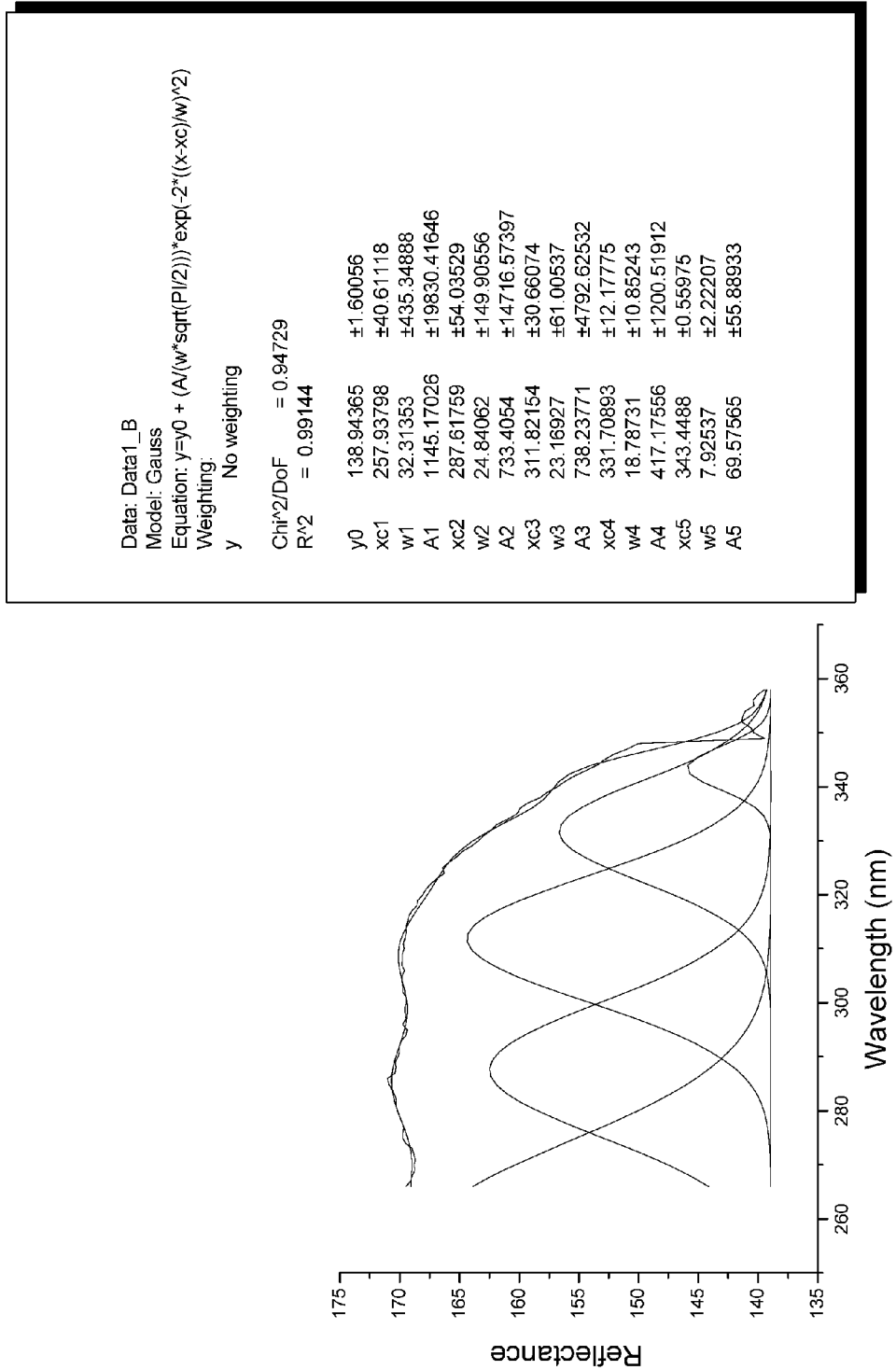
FIG. 3 provides UV-VIS spectroscopy for the catalyst of Example 8.

The catalyst of Example 8 was analyzed by UV-VIS spectroscopy. FIG. 3 provides identification of titanium species in the surface of the catalytic support. See wave number values, titanium chemical species and their concentration in the following Table:

| | Example 8 | | | | |
|---|---|---|---|---|---|
| Wave number (nm) | 257.9 | 287.6 | 311.8 | 331.7 | 343.4 |
| Chemical species | Pentacoordinated Ti | Pentacoordinated Ti | Oligomerical octahedric Ti (IV)) | Oligomerical octahedric Ti (IV) | Oligomerical octahedric Ti (IV) |
| Concentration (%) | 34.9 | 21.6 | 25.9 | 13.4 | 4.2 |

XANES Spectroscopy

Figure 4:
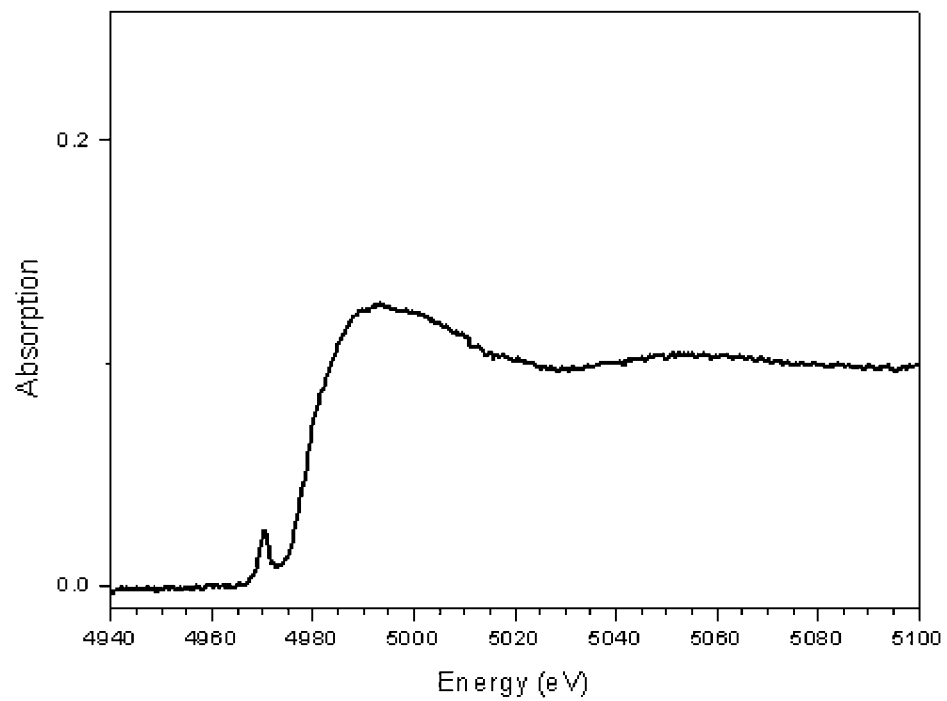
FIGS. 4-6 provides XANES spectra at the Ti K edge for the catalyst of Example 8.
Figure 5:
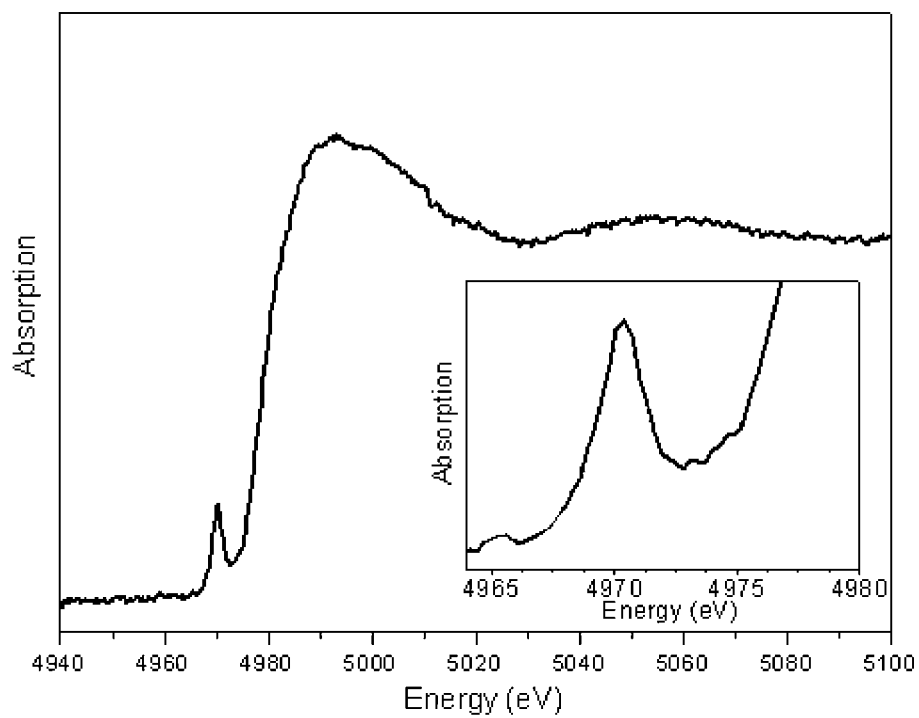
Figure 6:
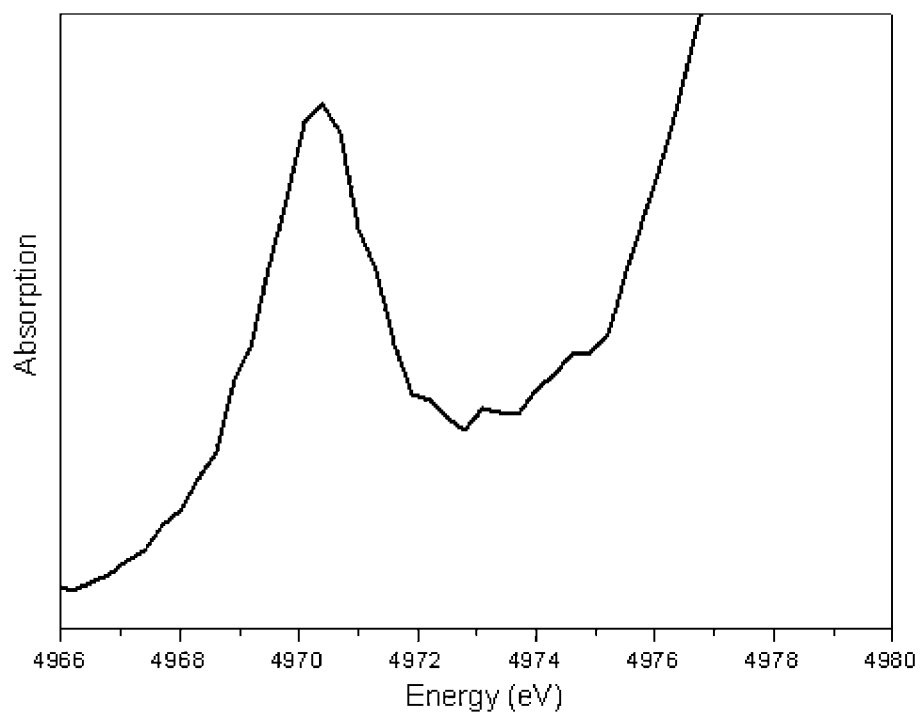

XANES spectroscopy analysis was done for the catalyst of Example 8. XANES spectra at the Ti K edge are presented in FIG. 4. The spectra is shifted in the y axis for a better inspection of the XANES features. A representation of the pre-edge structures is presented in FIG. 5. The inset corresponds to the superposition of the pre-edge structures. FIG. 6 provides close inspection of the pre-edge features for Example 8.

Example 9

In a 5 liter flask fitted with a mechanical stirrer and previously purged with nitrogen were fed 52.8 g (0.554 moles) of anhydrous $MgCl_2$ and 396 ml (1.163 moles) of $Ti(OBu)_4$. This mixture was allowed to stir at 300 rpm and heated to 150°

C. for about 12 hours in order to have the solids completely dissolved, thereby a clear liquid product was obtained. This resulting liquid was cooled down to 40° C. and under gently stirring at 150 rpm, it was diluted with 3200 ml of anhydrous hexane. Into this solution kept at 40° C. and under the same stirring, 300 g of the silica support were added. This silica was previously dehydrated and treated with 23 ml (0.167 moles) of triethylaluminum diluted in anhydrous hexane, for 50 minutes and at room temperature. Once the addition of the silica is completed, the mixture was heated to 60° C. and kept at this temperature for 1 hour. To this mixture a solution of 200 ml of anhydrous hexane and 221 ml of $SiCl_4$ (1.929 moles) was dropped over a period of time of 1 hour. At the end of the addition, stirring was continued for 3.5 hours at a temperature of 60° C. The temperature of the mixture was then brought to 65° C. and kept for additional 2 hours. After cooling the mixture to room temperature, the stirring was stopped to have the solid settled. The supernatant liquid was removed, and the solid was repeatedly washed with anhydrous hexane. The solid thus obtained was again suspended in 2200 ml of anhydrous hexane and then 30 g of DEAC (0.249 moles) in 200 ml of anhydrous hexane were added to the resulting suspension under gently stirring. Contact was maintained for 50 min at room temperature. The supernatant liquid was removed and the solid was once again suspended in 2200 ml of anhydrous hexane and then 30 g of Tn-HAL (0.106 moles) in 200 ml of anhydrous hexane were added to the resulting suspension under gently stirring. Contact was maintained for 50 min at room temperature. Finally, the supernatant liquid was removed and the solid was dried at 60° C. under nitrogen flow thus giving 340 g of a brown-reddish powder.

The chemical and physical characteristics of the resulting reddish powder were as follows:
Total Titanium=1.9% (by weight)
Mg=2.9% (by weight)
$SiO_2$=74.1% (by weight)
Al=1.5% (by weight)
Cl=12.6% (by weight)
OBu=6.0% (by weight)
Surface Area (B.E.T.)=167 $m^2/g$
Pore Volume (B.E.T.)=0.20 $cm^3/g$ Example 10

In a 5 liter flask fitted with a mechanical stirrer and previously purged with nitrogen were fed 24 g (0.252 moles) of anhydrous $MgCl_2$ and 180 ml (0.528 moles) of $Ti(OBu)_4$. This mixture was allowed to stir at 300 rpm and heated to 150° C. for about 12 hours in order to have the solids completely dissolved, thereby a clear liquid product was obtained. This resulting liquid was cooled down to 40° C. and under gently stirring at 150 rpm, it was diluted with 3200 ml of anhydrous hexane. Into this solution kept at 40° C. and under the same stirring, 300 g of the silica support were added. This silica was previously dehydrated and treated with 23 ml (0.167 moles) of triethylaluminum diluted in anhydrous hexane, for 50 minutes and at room temperature. Once the addition of the silica is completed, the mixture was heated to 60° C. and kept at this temperature for 1 hour. To this mixture a solution of 100 ml of anhydrous hexane and 100 ml of $SiCl_4$ (0.873 moles) was dropped over a period of time of 1 hour. At the end of the addition, stirring was continued for 3.5 hours at a temperature of 60° C. The temperature of the mixture was then brought to 65° C. and kept for additional 2 hours. After cooling the mixture to room temperature, the stirring was stopped to have the solid settled. The supernatant liquid was removed, and the solid was repeatedly washed with anhydrous hexane. The solid thus obtained was again suspended in 2200 ml of anhydrous hexane and then 60 g of DEAC (0.498 moles) in 200 ml of anhydrous hexane were added to the resulting suspension under gently stirring. Contact was maintained for 50 min at room temperature. Finally, the supernatant liquid was removed and the solid was dried at 60° C. under nitrogen flow thus giving 300 g of a brown-reddish powder.

The chemical and physical characteristics of the resulting reddish powder were as follows:
Total Titanium=2.0% (by weight)
Mg=1.3% (by weight)
$SiO_2$=76.3% (by weight)
Al=2.3% (by weight)
Cl=10.8% (by weight)
OBu=6.3% (by weight)
Surface Area (B.E.T.)=200 $m^2/g$
Pore Volume (B.E.T.)=0.45 $cm^3/g$ Laboratory Polymerization Tests Example 11

Polymerization of Ethylene (HDPE)

A 4-liter stainless steel autoclave, purged under nitrogen flow for 1 hour at 75° C. and then cooled to 30° C., was fed with 0.06 g of the solid catalyst component from the example 8, 0.79 g of TEAL mixed with 75 ml of anhydrous hexane, and 280 g of anhydrous propane. The temperature was raised to 60° C., and then 520 g of anhydrous propane were fed. The temperature was raised again to 80° C. and then 2 bars of hydrogen were fed simultaneously with 7 bars of ethylene. After that, the temperature was settled to 85° C. The polymerization was conducted in slurry liquid phase. The polymerization time was 2 hours, during which time the ethylene pressure was kept constant. After this period the reaction was stopped by venting off ethylene, hydrogen and propane and 55 g of polymer were obtained, which exhibited the following properties:

| MIE | 2.4 g/10 min |
| MIF/MIE | 26 |
| Polymer Density | 0.96 $g/cm^3$ |
| Bulk Density | 0.46 $g/cm^3$ |

Example 12

Copolymerization of Ethylene with Butene-1 (LLDPE)

A 4 liter stainless steel autoclave, purged under nitrogen flow for 1 hour at 75° C. and then cooled to 30° C., was fed with 0.06 g of the solid catalyst component from the example 8, 0.78 g of TEAL mixed with 75 ml of anhydrous hexane, and 280 g of anhydrous propane. The temperature was raised to 60° C., and then 520 g of anhydrous propane were fed. The temperature was raised again to 70° C., and then 290 ml of butene-1 were fed simultaneously with 2 bars of hydrogen and 5 bars of ethylene. After that, the temperature is settled to 75° C. The polymerization was conducted in slurry liquid phase. The polymerization time was 3 hours, during which time the ethylene pressure was kept constant. After this period the reaction was stopped by venting off ethylene, butene-1, hydrogen and propane and 240 g of polymer were obtained, which exhibited the following properties:

| | |
|---|---|
| MIE | 0.91 g/10 min |
| MIF/MIE | 26 |
| Fraction Soluble in Xylene | 9.2% |
| Comonomer content | 8.7% |
| Polymer Density | 0.917 g/cm³ |
| Bulk Density | 0.36 g/cm³ |

Pilot Plant Tests

Figure 2:
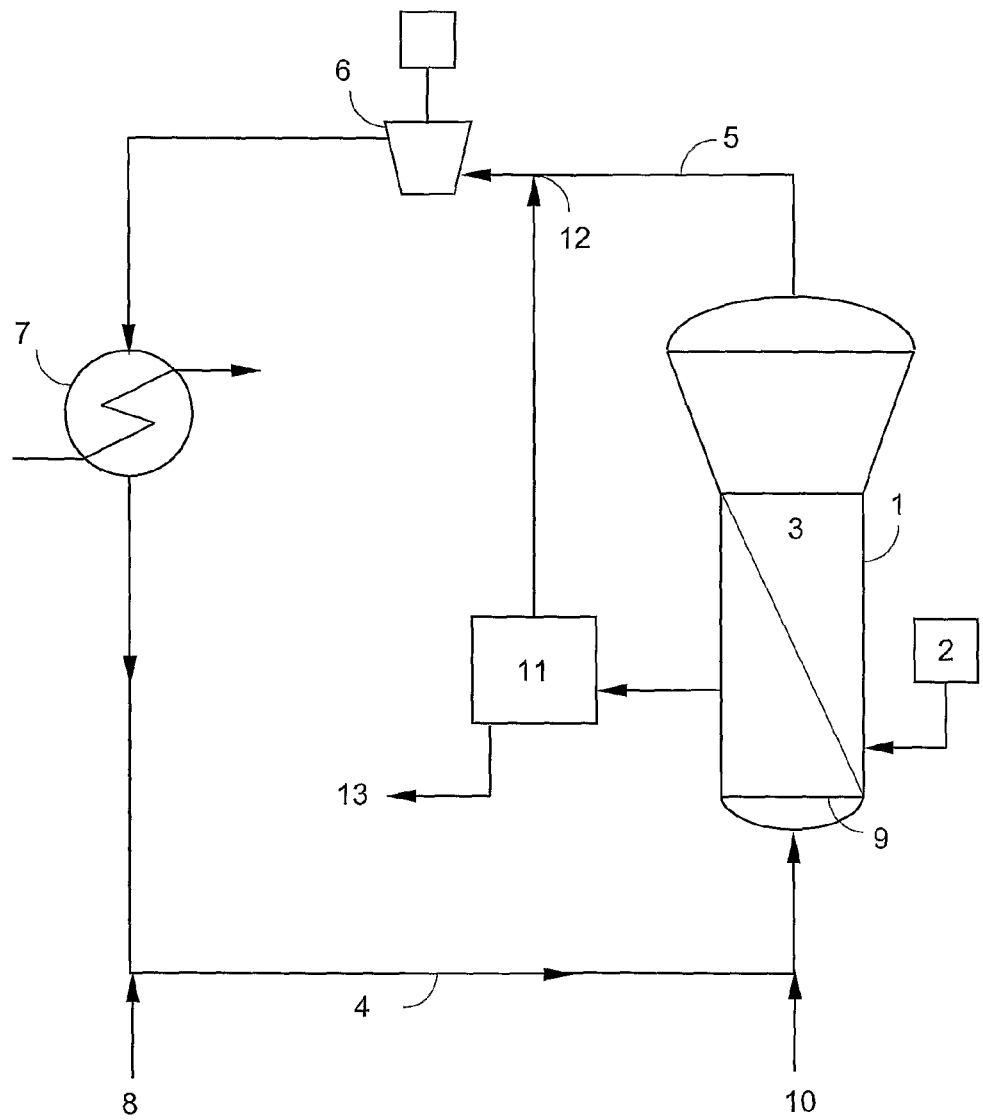
FIG. 2 is a flow diagram of a fluidized bed, gas phase pilot plant used to produce polyethylene.

A pilot plant continuously operated was used to prepare LLDPE as shown in FIG. 2.

A fluidized bed gas phase reactor 1 with 45 cm of internal diameter and 120 cm of reaction zone height is fed by a dry-solid catalyst feeder 2. The bed of polymer particles in reaction zone 3 is kept in fluidized state by a recycle stream 4 that works as a fluidizing medium as well as a dissipating heat agent for absorbing the exothermal heat generated within reaction zone 3. The superficial velocity of the gas, resulting from the flow rate of recycle stream 4 within reactor 1 is 0.7 m/s. Stream 5, which contains the gas discharged from reactor 1, said gas having low monomer contents, is fed to the suction of compressor 6. The combined reaction and compression heats are then removed from recycle stream 5 in an external heat exchange system 7 in order to control the reactor temperature. The composition of stream 5 is kept constant to yield a polymer with the required specifications.

Make-up components are fed to the system at spot 8 so as to make up the composition of recycle stream 5. So, make-up stream 8 will include the triethyl aluminum (TEAL) that directly reacts in a ratio of 2 moles of TEAL per mole of catalyst. Also at the spot 8, propane is fed as the selected non-reactive compound required to maintain the total pressure of the system.

The polymerization catalyst is introduced as a dry powder by a catalyst feeder into reactor 1 in a site within the reaction zone 3, close to the distributing plate 9 in a rate to control the residence time of the catalyst. The reactive gases, including ethylene and comonomers are introduced at the spot 10.

The produced polymer is discharged from the reaction zone through a discharge system 11 that provides the recovery of the reactive and non-reactive gases, recycling said gases back to the recycle stream 5 at spot 12 and lowers the pressure of the discharged mixture of polymer and gases at certain pressure for later conveying the produced polymer particles 13 for downward sampling.

Examples 13 to 23

The examples 13 to 23 were conducted in the gas phase pilot reactor at 88° C., using in each EXAMPLE respectively the catalysts produced in the EXAMPLES 1 to 10. The catalyst produced in the EXAMPLE 10 was also used in the pilot polymerization at 75° C. as shown in the EXAMPLE 23.

In all examples the pilot reactor run was performed smoothly, with good catalytic yield and no agglomerates or sheets were formed. The polymers obtained had a good morphology and, in most cases, less than 1% of fines (<250 μm).

The films obtained with these polymers presented very good optical properties and a low blocking strength.

During the performance of the EXAMPLE 20 it was performed a decay test and the measured half-life time was 3.8 hours.

The results are shown in table 1.

TABLE 1

| EXAMPLE | 13 | 14 | 15 | 16 | 17 | 18 | 19 | 20 | 21 | 22 | 23 |
|---|---|---|---|---|---|---|---|---|---|---|---|
| Catalyst used | Ex. 1 | Ex. 2 | Ex. 3 | Ex. 4 | Ex. 5 | Ex. 6 | Ex. 7 | Ex. 8 | Ex. 9 | Ex. 10 | Ex. 10 |
| Ti (%) | 7.0 | 1.4 | 1.2 | 1.5 | 1.7 | 1.8 | 2.1 | 2.0 | 1.9 | 2.0 | 2.0 |
| Mg (%) | 2.0 | 0.5 | 0.3 | 0.3 | 2.4 | 2.7 | 1.3 | 1.5 | 2.9 | 1.5 | 1.5 |
| Temperature (° C.) | 88 | 88 | 88 | 88 | 88 | 88 | 88 | 88 | 88 | 88 | 75 |
| Ethylene partial pressure (bar) | 3 | 11.8 | 9 | 10.9 | 5 | 7 | 7 | 7 | 7 | 7 | 7 |
| Total pressure (bar) | 21 | 22 | 21 | 21 | 21 | 21 | 21 | 21 | 21 | 21 | 21 |
| Residence Time (h) | 4.43 | 3.71 | 5.32 | 3.20 | 4.86 | 3.92 | 3.18 | 2.89 | 3.91 | 3.70 | 3.15 |
| $H_2$/ethylene (mole/mole) | 0.10 | 0.098 | 0.086 | 0.096 | 0.096 | 0.118 | 0.098 | 0.12 | 0.13 | 0.12 | 0.17 |
| Butene/ethylene (mole/mole) | 0.39 | 0.41 | 0.46 | 0.44 | 0.35 | 0.40 | 0.39 | 0.41 | 0.37 | 0.41 | 0.45 |
| Catalytic yield (kg/g) | 3.0 | 1.6 | 1.7 | 1.6 | 4.3 | 7.5 | 5.0 | 7.5 | 7.1 | 7.1 | 6.2 |
| Bulk Density (g/cm³) | 0.28 | 0.34 | 0.38 | 0.34 | 0.29 | 0.31 | 0.38 | 0.38 | 0.38 | 0.38 | 0.35 |
| MIE (g/10 min) | 0.68 | 0.66 | 0.72 | 0.74 | 0.64 | 0.68 | 0.69 | 0.67 | 0.69 | 0.65 | 0.57 |
| MIF (g/10 min) | 20.4 | 17.3 | 20.6 | 19.9 | 23.3 | 18.6 | 19.1 | 17.6 | 18.2 | 16.9 | 15.2 |
| MFR - F/E | 30 | 26 | 28 | 27 | 36 | 27 | 28 | 26 | 26 | 26 | 26 |
| Comonomer Content (%) | 8.8 | 7.8 | 8.7 | 7.7 | 9.4 | 8.3 | 8.4 | 7.9 | 8.2 | 8.1 | 8.8 |
| Fraction Soluble in Xylene (%) | 12.3 | 8.9 | 9.4 | 7.1 | 13.7 | 9.4 | 9.5 | 7.8 | 10.1 | 8.0 | 9.3 |
| Polymer Density (g/cm³) | 0.918 | 0.918 | 0.918 | 0.919 | 0.917 | 0.918 | 0.918 | 0.918 | 0.918 | 0.918 | 0.917 |
| Flowability (s/100 g) | — | 14.4 | 11.1 | 13.3 | 14.4 | 17.9 | 12.4 | 11.9 | 10.8 | 12.7 | 12.6 |
| Particle size distribution (wt %) | | | | | | | | | | | |
| <250 μm | 2 | 2 | 1 | 1 | 2 | 3 | <0.5 | 1 | 1 | 1 | 1 |
| 250-420 μm | 7 | 7 | 7 | 2 | 7 | 5 | 2 | 2 | 2 | 2 | 2 |
| 420-840 μm | 37 | 49 | 60 | 35 | 45 | 28 | 36 | 35 | 28 | 39 | 37 |
| >840 μm | 54 | 42 | 32 | 62 | 46 | 64 | 62 | 62 | 69 | 58 | 60 |
| Haze (%) | 11.3 | — | — | — | — | — | 11.6 | 11.3 | 11.3 | 11.4 | — |
| Gloss (%) | 73.0 | — | — | — | — | — | 79.5 | 80.7 | 79.3 | 80.2 | — |
| Blocking (g/100 cm²) | — | 22 | 21 | 15 | — | 24 | 24 | 16 | 30 | 19 | 24 |

The invention claimed is:

1. A catalyst composition free of polar solvents and used for the homopolymerization of ethylene or used for the copolymerization of ethylene with one or more alpha-olefins which consists essentially of an activated particulate silica carrier, impregnated with an organometallic compound and catalytic active components including magnesium, titanium and chlorine, wherein, based on the weight of the catalyst, titanium is present in an amount of 2.0% by weight, magnesium is present in an amount of 1.5% by weight, chlorine is present in an amount of 10.3% by weight, aluminum is present in an amount of 1.7% by weight, butoxy group is present in an amount of 6.7% by weight, Surface Area (B.E.T.) is 202 m²/g, and Pore Volume (B.E.T.) is 0.48 cm³/g, wherein said catalyst displays a UV-VIS spectra as shown in FIG. 3 and an X-Ray Absorption Near Edge Structure spectra as shown in one or more of FIGS. 4, 5 and 6.

2. The catalyst composition of claim 1, wherein the product of the homopolymerization or copolymerization exhibits less than 1% of fines.

\* \* \* \* \*